E. WEINTRAUB.
RECEIVER FOR WIRELESS TELEGRAPHY.
APPLICATION FILED JULY 24, 1905. RENEWED SEPT. 2, 1911.
1,116,183.
Patented Nov. 3, 1914.
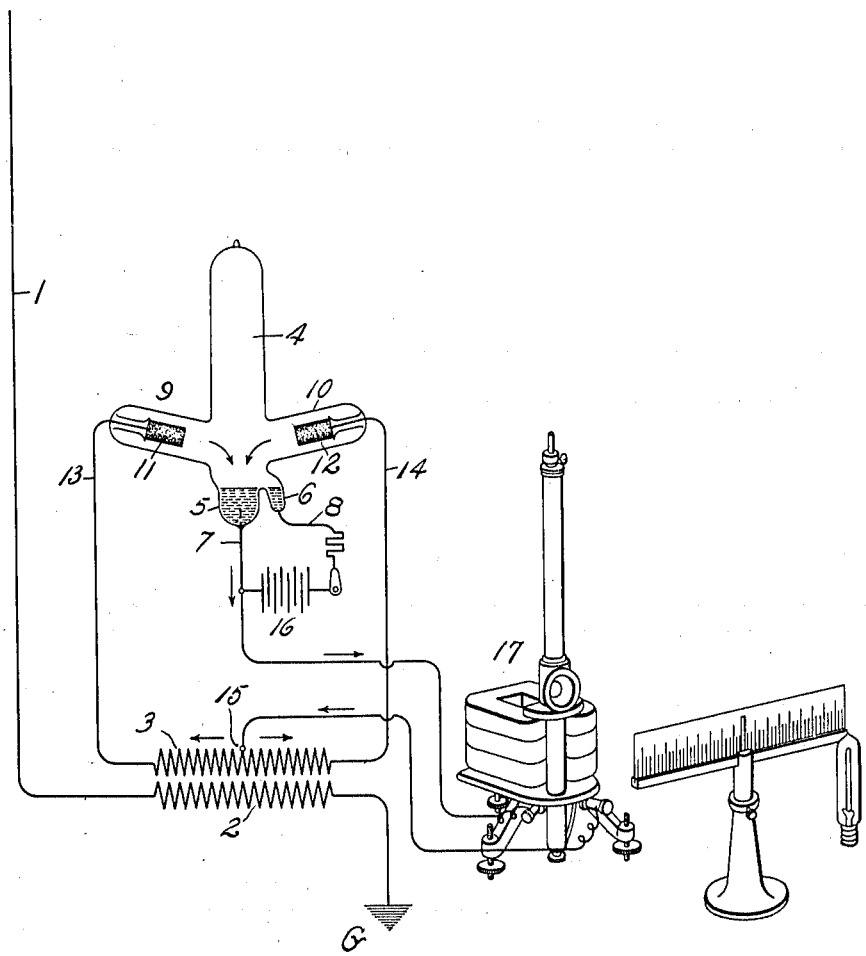
Witnesses:
Inventor:
Ezechiel Weintraub.
by His Attorney.

UNITED STATES PATENT OFFICE.

EZECHIEL WEINTRAUB, OF SCHENECTADY, NEW YORK, ASSIGNOR TO GENERAL ELECTRIC COMPANY, A CORPORATION OF NEW YORK.

RECEIVER FOR WIRELESS TELEGRAPHY.

1,116,183.  Specification of Letters Patent.  Patented Nov. 3, 1914.

Application filed July 24, 1905, Serial No. 270,943. Renewed September 2, 1911. Serial No. 647,436.

*To all whom it may concern:*

Be it known that I, EZECHIEL WEINTRAUB, a subject of the Czar of Russia, residing at Schenectady, county of Schenectady, State of New York, have invented certain new and useful Improvements in Receivers for Wireless Telegraphy, of which the following is a specification.

I have discovered means whereby electric oscillations of high frequency, such for example as the electromagnetic waves employed in transmitting intelligence by means of wireless telegraphy, may be rectified or converted into unidirectional impulses. These unidirectional impulses I transmit to a sensitive mirror galvanometer, or similar device, and through the deflections thereby obtained in the instrument I am able to receive messages transmitted through the medium of electromagnetic waves or oscillations.

My invention is not in all respects limited to the particular manner of utilization above briefly set forth, but is capable of more extended use. The features of novelty of the invention I have pointed out with particularity in the appended claims.

The invention itself will be better understood by reference to the following description taken in connection with the accompanying drawing which, in a diagrammatic manner, forms a representation of a system embodying my invention.

In the drawings, the receiving line, or aerial conductor, is indicated at 1 and is shown as connected to ground at G. The oscillations which traverse this conductor I cause to pass through the primary winding 2 of a transformer, the secondary of which is indicated at 3. The transformer in the present instance is shown as a step-up transformer by which the potential of the impulses generated in the secondary winding is raised to a degree dependent upon the ratio of transformation chosen.

The impulses or oscillations which thus appear in the secondary winding 3, being alternating in character, may, I have found, be rectified or converted into unidirectional impulses by means of a vapor rectifier invented by me. Such a rectifier may assume any one of a large variety of forms. For illustration, I have therefore chosen but one of the many suitable arrangements which might be used.

Referring to the drawings, the rectifier proper will be seen to consist of a highly evacuated receptacle 4 of glass or other suitable material. This receptacle is shaped with two pockets 5 and 6 which are filled with mercury. These two pockets of mercury constitute electrodes to which electrical connection is effected by means of suitable leading-in wires 7 and 8. The envelop or container of the rectifier is also provided with outwardly extending arms or chambers 9 and 10, in each of which is located one of a pair of electrodes 11 and 12 of artificial graphite or the like. Electrical connections to these electrodes are likewise made in the ordinary manner by means of leading-in conductors 13 and 14.

In connecting up the apparatus in circuit the electrodes 11 and 12 are connected with the terminals of the transformer secondaries 3. The mercury electrode 5 is connected in a circuit leading to the middle point 15 of the transformer secondary. Of the electrodes mentioned those numbered 11 and 12 operate as positive electrodes or anodes and the electrode 5 as the negative electrode or cathode. The impulses received from the aerial conductor are of such small magnitude that of themselves they would be insufficient, at least ordinarily, to maintain self-sustaining arcs in the rectifier 4. Moreover, for the purpose of transmitting signals these impulses would necessarily be discontinuous, and thus, no matter what their magnitude, would therefore be incapable of maintaining a constant flow of current in the rectifier. Therefore in order to keep the rectifier at all times alive and in condition for rectifying impulses received from the aerial, I provide means for keeping the cathode or negative electrode 5 constantly in an excited condition, and this I do by maintaining a small arc between the cathode 5 and the auxiliary electrode 6. This result is accomplished by means of current from some separate source such as a storage battery 16 connected as shown between the two electrodes. An arc between the electrodes is started by tilting or shaking the apparatus so as to cause a momentary engagement between the two bodies of mercury, upon the breaking of which engagement an arc is sprung which continues indefinitely and continuously ionizes the space in the rectifier. The direction of current is chosen from the electrode 6 to 11c the electrode 5 so that the electrode 5 is a cathode. When the electrode 5 is thus excited the impulses of the secondary 3 are rectified so as to produce unidirectional waves in the circuit between the electrode 5 and the point 15. Thus a current wave of one direction will produce a flow of current from the secondary 3, to the anode 11, through the rectifier, and then through the circuit between the electrode 5 and the point 15, while waves of the opposite direction take the path from the opposite side of the secondary 3 to the anode 12, thence through the rectifier to the electrode 5, and then in the same direction as the other wave, through the circuit to the point 15. It will thus be seen that whichever the direction of current generated in the transformer secondary, the resulting waves flow in the same direction in the circuit between the electrode 5 and the point 15 of the transformer.

Now in order to make evident the existence of the electromagnetic waves or oscillations I connect in the circuit between the cathode 5 and the point 15 of the transformer a device which is sensitive to exceedingly minute currents. Such a device may consist of a delicate reflecting galvanometer of any type well understood in the art. Such a galvanometer I have indicated conventionally at 17. This galvanometer may of course be provided as usual in such instruments with suitable damping means to prevent undue oscillation of the movable member thereof and thus enable it in quick succession to receive successive signals.

I do not herein lay claim broadly to the rectifier herein disclosed nor to the particular means whereby both half waves of the alternating current are rectified, since these features, as well as others, are disclosed in pending applications filed by me. I refer to Serial No. 127,834, filed Oct. 18th, 1902; Serial No. 149,081, filed Mar. 23, 1903; and Serial No. 149,084, filed Mar. 23, 1903.

What I claim as new, and desire to secure by Letters Patent of the United States, is,—

1. In a wireless telegraph system, the combination of an aerial or receiving conductor, a rectifier with a constantly excited cathode for changing waves of both polarities received thereby into uni-directional waves or impulses, and a device arranged to be subjected to said uni-directional impulses.

2. In a wireless telegraph system, means for rectifying electromagnetic waves of both polarities, a circuit traversed in the same direction by the resulting uni-directional waves, and means for rendering apparent the existence of said uni-directional waves.

3. The combination of receiving means for electromagnetic waves, a vapor electric rectifier for converting waves of both polarities into uni-directional impulses, and an indicating device having a circuit traversed in the same direction by said impulses.

4. The combination of an aerial conductor, a rectifier for producing uni-directional impulses corresponding to waves received over said aerial conductor, said rectifier utilizing both polarities of said waves, a circuit traversed in the same direction by the rectified waves, and means in said circuit responsive to the rectified waves.

5. The combination of an aerial conductor, a rectifier for producing uni-directional impulses corresponding to waves received over said conductor, said rectifier utilizing both polarities of said waves, a circuit traversed in the same direction by the rectified waves, and a galvanometer in said circuit.

6. In a wireless telegraph system, the combination of an aerial conductor, a rectifier with a constantly excited cathode for changing waves of both polarities received through said conductor into uni-directional waves or impulses, and means responsive to said uni-directional impulses.

7. In a wireless telegraph system, the combination of an aerial conductor, a vapor rectifier connected to said conductor to be traversed by waves from said conductor, means for ionizing the space in said rectifier and means connected to said rectifier to respond to waves traversing said rectifier from said conductor.

8. A receiving means for electromagnetic signal waves of high frequency, comprising a receiving conductor, a mercury vapor device having an anode and a cathode connected in operative relation to said conductor, means for constantly maintaining a sustaining arc in said device, and means for utilizing the rectified impulses for the indication of signals.

9. A receiving system for radio-telegraphy comprising a receiving conductor, a mercury vapor rectifier maintained in an ionized state, operatively connected to said conductor and means for detecting rectified current impulses.

In witness whereof I have hereunto set my hand this 22nd day of July, 1905.

EZECHIEL WEINTRAUB.

Witnesses:
 BENJAMIN B. HULL,
 L. MAY WHITTAKER.